United States Patent [19]

Wilkinson

[11] Patent Number: 5,057,920

[45] Date of Patent: Oct. 15, 1991

[54] VIDEO SIGNAL CLAMPING CIRCUIT OPERATING IN THE DIGITAL DOMAIN FOR REMOVING EXCESS NOISE ON THE BLACK LEVEL AND FOR PROVIDING D C RESTORATION

[75] Inventor: James H. Wilkinson, Tadley, England

[73] Assignee: Sony Corporation, Tokyo, Japan

[21] Appl. No.: 472,839

[22] Filed: Jan. 31, 1990

[30] Foreign Application Priority Data

Feb. 28, 1989 [GB] United Kingdom ............... 8904508

[51] Int. Cl.$^5$ .................... H04N 5/16; H04N 5/18; H04N 5/14
[52] U.S. Cl. .................................. 358/171; 358/172; 358/170
[58] Field of Search ............... 358/172, 171, 170, 166

[56] References Cited

U.S. PATENT DOCUMENTS

| | | | |
|---|---|---|---|
| 3,207,998 | 9/1965 | Corney et al. | 358/172 |
| 3,670,100 | 6/1972 | Briggs et al. | 358/171 |
| 4,110,790 | 8/1978 | Wheeler | 358/172 |
| 4,403,253 | 9/1983 | Morris et al. | 358/166 |
| 4,562,471 | 12/1985 | Eouzan et al. | 358/172 |
| 4,651,213 | 3/1987 | Takimoto | 358/171 |
| 4,663,666 | 5/1987 | Bloom | 358/166 |
| 4,742,392 | 5/1988 | Hashimoto | 358/171 |
| 4,811,087 | 3/1989 | Engel et al. | 358/172 |
| 4,811,101 | 3/1989 | Yagi | 358/171 |

FOREIGN PATENT DOCUMENTS 2730208 1/1978 Fed. Rep. of Germany ...... 358/172
0208770 12/1982 Japan ................................ 358/171

Primary Examiner—John K. Peng
Assistant Examiner—Jeffrey S. Murrell
Attorney, Agent, or Firm—Alvin Sinderbrand; William S. Frommer

[57] ABSTRACT

In a video signal clamping circuit, a FIFO register stores a sequence of digital samples of an input video signal taken during a portion of a horizontal blanking interval of the signal during which the signal is at a black level. A black level error PROM generates a digital error signal representing any deviation between a digital sample from the FIFO register and a reference black level. An accumulator accumulates digital error signals supplied thereto by the PROM to produce an accumulated digital error signal which is converted to analog form by a digital-to-analog converter. A clock controls the supply of the stores samples in sequence from the FIFO register to the PROM such that the samples are supplied, during a line-active period that follows the horizontal blanking interval, at a clock frequency which is less than the sampling frequency. The analog error signal is combined with the input video signal in an operational amplifier to cause the black level of the input video signal to approach the reference black level.

7 Claims, 3 Drawing Sheets

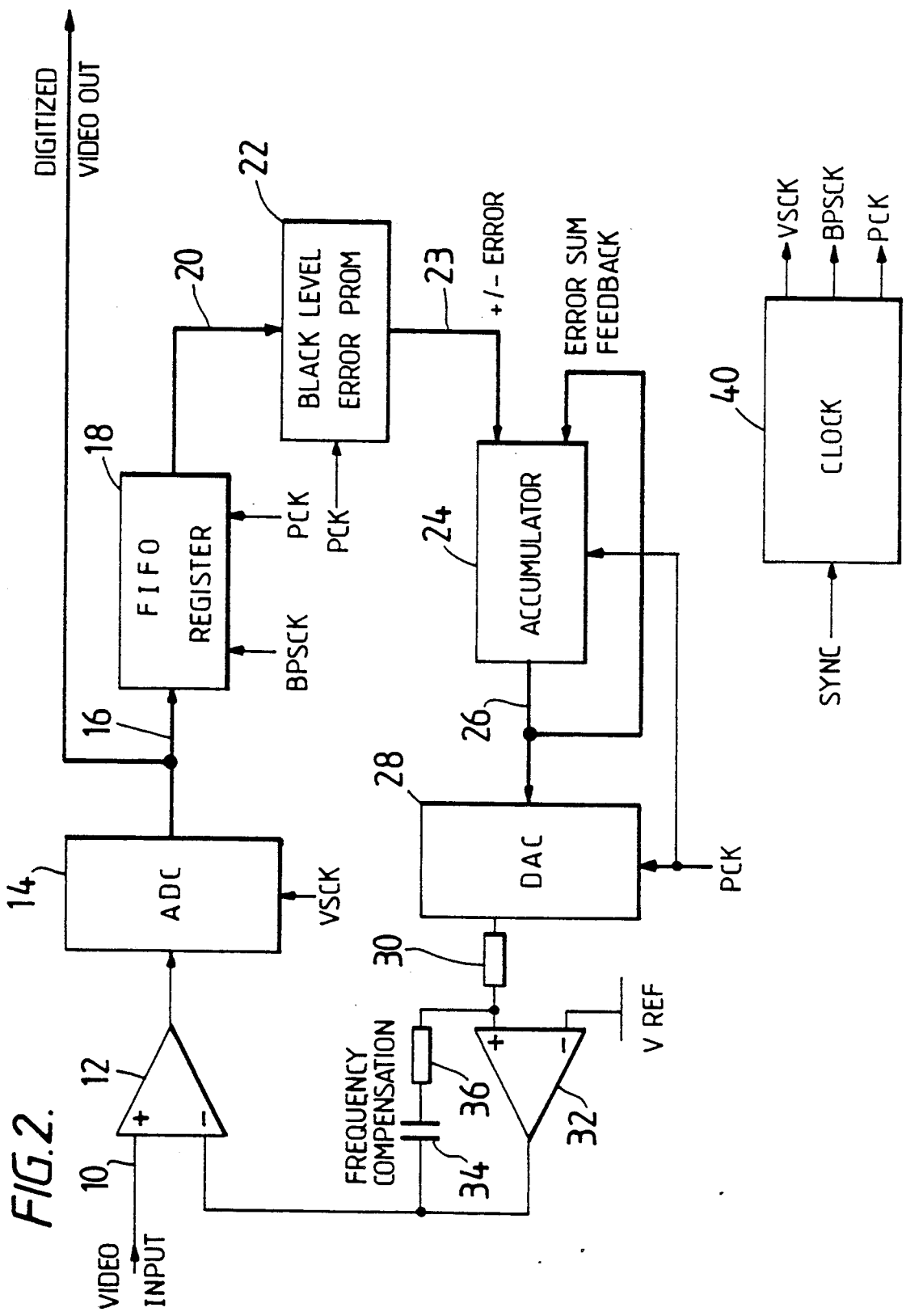

VIDEO SIGNAL CLAMPING CIRCUIT OPERATING IN THE DIGITAL DOMAIN FOR REMOVING EXCESS NOISE ON THE BLACK LEVEL AND FOR PROVIDING D C RESTORATION

BACKGROUND OF THE INVENTION

Field of the Invention

This invention relates to video signal clamping.

FIG. 1 of the accompanying drawings shows part of a video signal waveform in the region of a horizontal blanking interval thereof. During the horizontal blanking interval, the waveform should be steady at a level which is the black level of the picture, except during the occurrence of the line synchronization pulse (which goes to a blacker-than-black level). It is well known in the art to clamp the black level to a reference black level. The clamping performs two functions. The first is to remove any spurious signal ("hum" or noise), e.g. in the form of a distorted supply or mains waveform (e.g. 60 Hz or 50 Hz) that may be modulated on the black level. This must be removed to avoid gross distortion of the picture. The second function is one of d c restoration, namely to clamp the black level to a reference level so that it does not vary with picture content.

Conventionally, analog circuits have been used to perform video signal clamping. As is well known, however, analog circuits tend to be unstable with temperature. So, it has been previously proposed to supplement an analog clamping circuit with a digital clamping circuit. According to this proposal, the analog circuit performs the above-described function of removing the distorted supply waveform ("supply hum") and the digital circuit follows up to provide the above described function of dc restoration, that is to say removing dc imbalance. The previously proposed digital circuit employed an analog-to-digital converter (ADC) which, using the leading edge of the line synchronization pulse as a time reference, took and digitized a sample of the level of the signal at a position on the "back porch" of the horizontal blanking interval, namely that part of the waveform that extends from the trailing edge of the line synchronization pulse to the start of the picture signal. The digital sample was compared with a reference level in a digital comparator and the resultant digital error signal was supplied to an analog integrator having a long time constant (of the order of seconds) to produce an analog error signal (integrated over many lines of the picture) which was combined with the original video signal in a sense to compensate for any error in the black level. Thus, the previously proposed digital circuit took one sample of the signal (on the back porch) per line and relied on a very long time of integration. It performed dc restoration only, the analog clamping circuit providing the function of removing spurious "supply hum".

An object of this invention is to provide a video signal clamping circuit operating in the digital domain which can provide dc restoration and remove "supply hum".

SUMMARY OF THE INVENTION

The invention provides a video signal clamping circuit including storage means which stores a plurality of digital samples of an input video signal during a portion of a horizontal blanking interval of the signal during which the signal is at a black level. An error signal generator generates a digital error signal representing any deviation between a digital sample supplied thereto from the storage means and a reference black level. An accumulator accumulates digital error signals supplied thereto by the error signal generator to produce an accumulated digital error signal, and a digital-to-analog converter converts the accumulated digital error signal to an analog error signal. Clock means controls the supply of the stored plurality of digital samples in sequence from the storage means to the error signal generator such that the samples are supplied, during a line-active period that follows the horizontal blanking interval, at a clock frequency which is less than the sampling frequency, and a combining means combines the analog error signal with the input video signal in a sense to cause the black level of the input video signal to approach the reference black level.

In contrast to the previously proposed arrangement described above, a circuit in accordance with the invention can provide, in the digital domain, both of the above described clamping functions, namely dc restoration and removal of "supply hum". Thus, the storage means stores a plurality of samples taken during the horizontal blanking interval of each line. This provides a better average of the dc level, in case "hum" or noise is present on the signal. These samples are acquired in real time. However, the processing of these signals is carried out during the line-active periods that follow the horizontal blanking intervals, leading to the advantage that the processing circuitry can operate at a relatively low speed. Any deviation or error between each sample and the reference level is determined in the error signal generator and the accumulator (which can be considered to be a digital integrator) accumulates the errors and presents an integrated error to the digital-to-analog converter (DAC).

The portion of the horizontal blanking interval of the signal during which the samples are taken is preferably the back porch thereof, namely the portion following the trailing edge of the line synchronization pulse.

BRIEF DESCRIPTION OF THE DRAWINGS

The above and other objects, features and advantages of the invention will be apparent from the following description of illustrative embodiments which is to be read in conjunction with the accompanying drawings, in which:

FIG. 2 is a block schematic circuit diagram of a digital video signal clamping circuit embodying the invention;

DESCRIPTION OF THE PREFERRED EMBODIMENTS

Figure 1:
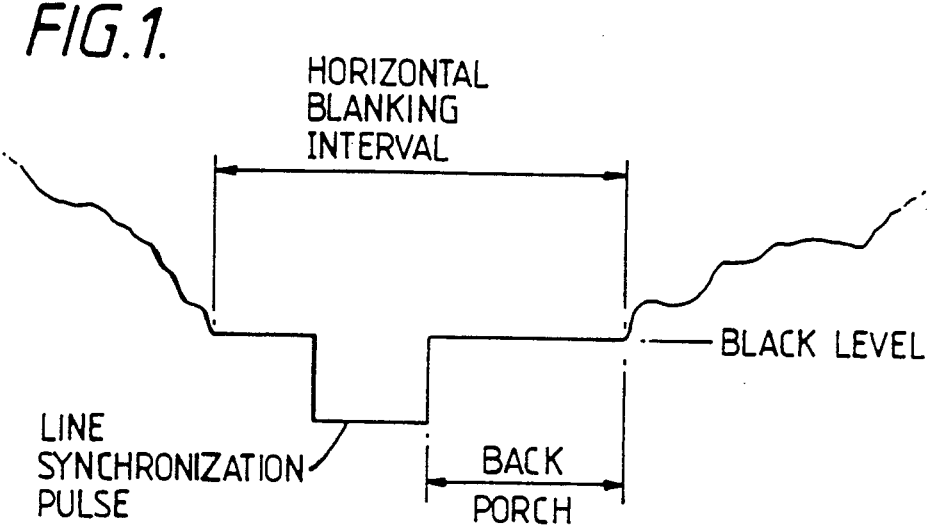
FIG. 1 shows a portion of a video signal waveform in the region of a horizontal blanking interval thereof.

FIG. 2 shows a digital video clamping circuit in which a video input signal on a line 10 is applied to a non-inverting input of an operational amplifier 12 which serves as a buffer amplifier. An output of the operational amplifier 12 is connected to an input of an analog-to-digital converter (ADC) 14. The ADC 14 samples the video input signal emerging from the operational amplifier 12 to produce an 8-bit digitized video signal. The digital video signal samples are connected by an 8-bit bus 16 to an input of a first-in, first-out (FIFO) register 18. An output of the FIFO register 18 is connected by an 8-bit bus 20 to an input of a black level error programmable read only memory (PROM) 22. An output of the PROM 22 is connected by a bus 23, which may be a 5-bit (or more) bus, to an input of a digital accumulator 24. An 8-bit bus 26 is connected to an output of the accumulator 24 and back to an input thereof. The bus 26 is also connected to an input of a low speed digital-to-analog converter (DAC) 28. An output of the DAC 28 is fed via a resistor 30 to a non-inverting input of an operational amplifier 32. An inverting input of the operational amplifier 32 is connected to a suitable reference voltage V ref. An output of the operational amplifier 32 is connected to an inverting input of the operational amplifier 12. A frequency compensation network comprising a capacitor 34 and a series-connected resistor 36 is connected between the output and the non-inverting input of the operational amplifier 32.

Figure 3:
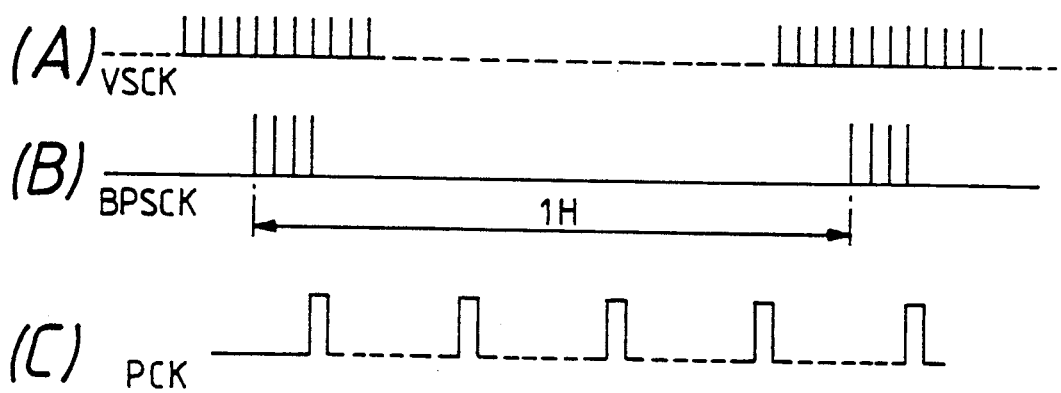
FIG. 3 shows waveforms of various clock signals generated in the circuit of FIG. 2.

The clamping circuit illustrated in FIG. 2 also comprises a clock 40 which receives the line synchronization pulses SYNC of the input video signal. The line synchronization pulses SYNC may be separated from the input video signal in a manner well known per se. The clock 40 produces three clock signals, namely a video sampling clock signal VSCK, a back porch sampling clock signal BPSCK and a processing clock signal PCK, which signals are shown in FIG. 3 at (A), (B) and (C), respectively.

The digital video signal clamping circuit shown in FIG. 2 operates in the following manner. The input video signal, after amplification by the operational amplifier 12, is digitized (to form 8-bit samples) by the ADC 14 at a frequency determined by the video sampling clock signal VSCK shown in FIG. 3(A). The video sampling clock frequency VSCK is a continuous train of pulses whereby a continuous 8-bit digitized video signal is produced on the bus 16. Under the control of the back porch sampling clock signal BPSCK, some only of the samples are fed or written into the FIFO register 18. More specifically, during the back porch of each horizontal blanking interval, a predetermined number of the samples (e.g. 4) is fed into the FIFO register 18. To this end, as shown in FIG. 3(B), the signal BPSCK comprises groups or sequences of (for example) 4 of the pulses of the video sample clock signal, each group or sequence being separated from the next by an interval 1H equal to the video input signal line interval and the timing of each group being such that it occurs on the back porch.

Thus, as described above, a sequence of a predetermined number of samples of the input video signal taken on each back porch is fed or written into the FIFO register 18 in real time (i.e. at digital video speed) during each back porch. Then, as described below, the signals thus written or stored in the FIFO register 18 are read out therefrom at a relatively low speed and processed during the line-active period of the video signal following the horizontal blanking interval during which the samples were taken. The speed of processing is controlled by the frequency of the processing clock signal PCK (FIG. 3(C)), which controls reading of the stored samples from the FIFO register 18 to the PROM 22 and which also controls operation of the PROM 22, accumulator 24 and DAC 28. To enable processing to be spread out throughout the whole of the line-active period, and thereby to enable the processing circuitry to operate as slowly as possible, the frequency of the processing clock signal PCK should be equal to n times the line frequency of the video input signal, where n is the number of digital samples stored in the FIFO register 18. Thus, in the present example, where it is assumed that 4 samples are stored in the FIFO register 18, the frequency of the clock signal PCK would in this case be 4 times the line frequency. In fact, this is the minimum frequency that could be employed for the clock signal PCK to enable all of the samples to be processed during the line-active period. The frequency may in fact be higher. Typically, a frequency of around 100 kHz can be used for the processing clock signal PCK.

The black level error PROM 22 produces on the bus 23 (preferably in 2's complement form) an error signal which indicates the magnitude and sense of any deviation from a reference black level of each sample read thereto from the FIFO register 18. If the video input signal is a luminance (Y) signal, the reference level will be set at 16 on the scale of 0 to 255 for an 8-bit signal. Therefore, for example, if a sample has a level of 15 the error signal on the bus 23 will represent −1 whereas if it has a level of 17 the error signal on the bus 23 will represent a level of +1. Since the level cannot go below zero (representing a deviation of −16) in this particular case the bus 23 need only be a 5-bit bus, though in other cases it might be appropriate to use a bus having a higher number of bits.

Each successive error signal fed into the accumulator 24 is added to the accumulated sum of previous errors, as fed back via the bus 26, to produce, on the output of the accumulator, an accumulated digital error signal. The accumulated digital error signal is converted to analog form (at the speed of the processing clock signal PCK) by the DAC 28. The analog accumulated error signal is then amplified by the operational amplifier 32 and fed to the inverting input of the operational amplifier 12 to close a feedback loop and to be combined with the input video signal in a sense to cause the black level thereof to approach the reference black level.

The frequency compensation network constituted by the capacitor 34 and resistor 36 provides a good transient response for the feedback loop described above. It configures the operational amplifier 32 to act as an integrator which integrates over a very short time period (of the order of tens of microseconds). It enables the circuit to handle approximately one volt of supply or mains "hum" (60 Hz or 50 Hz) superimposed on an input signal. A rate of change of voltage of one volt at 50 Hz can be managed by the loop. The resultant digital errors do not cause any overloading. Because the circuit is handling changes of frequency of tens of Hz, bandwidth control is needed to provided high frequency compensation, i.e. to stabilize the loop, because the operational amplifier 32 acts to some extent as an integrator. The frequency compensation network 34, 36 performs this function and prevents the loop oscillating. The frequency compensation network 34, 36 also acts to smooth the steps in voltage appearing at the output of the DAC 28 from appearing in the compensating signal applied to the inverting input of the operational amplifier 12.

The circuit described above with reference to FIG. 2 can handle input video signals of various kinds. The input video signal may, for example, comprise a composite color signal. In this event, the back porch will consist of the black level and a superimposed color burst. Conventionally, the color burst is filtered out for clamping. The present circuit will handle clamping effectively whether or not the color burst is filtered out. If, however, the color burst is not filtered out, the circuit must be configured so as effectively to filter out the color sub-carrier itself. This can be accomplished as follows. If the frequency fs of the sampling performed in the ADC 14 is equal to $p \times fsc$, where fsc is the color sub-carrier frequency, then the number of samples stored in the FIFO register 18 must be equal to or an integral multiple of p. This causes cancellation of the color burst (which would otherwise produce an error), that is it effectively produces sub-carrier notch filtering.

If the circuit of FIG. 2 is handling a composite color input video signal, the black level reference set in the PROM 22 will be 60 for an NTSC system or 64 for a PAL system.

The circuit of FIG. 2 can also handle component video signals. It can, for example, handle RGB signals, in which case the black reference level set in the PROM 22 will be 16 for each of R, G and B. It can also handle luminance (Y) and color difference (e.g. U/V) signals, in which case the black level reference set in the PROM 22 is 16 for luminance and 128 for color difference.

Figure 2A:
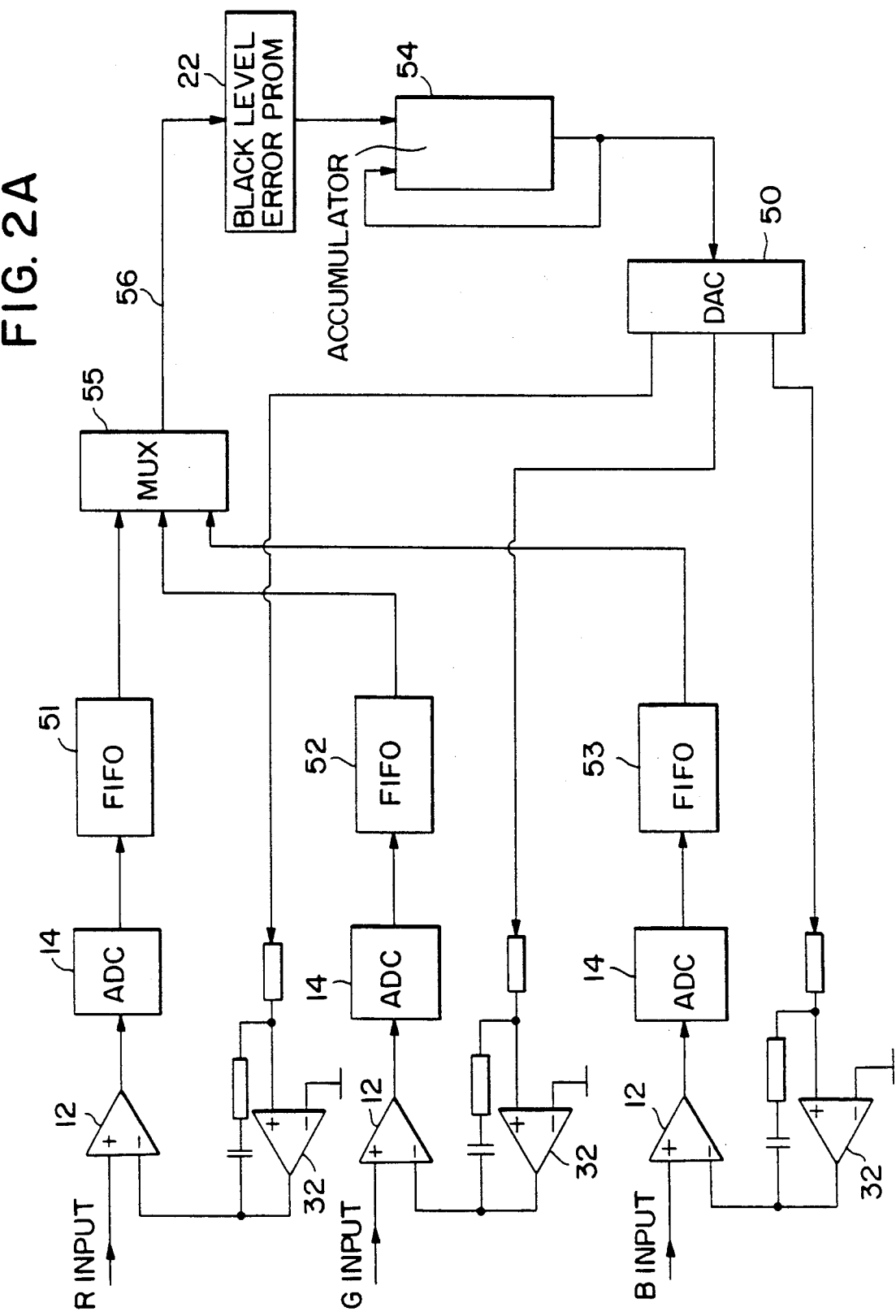
FIG. 2A is a block schematic circuit diagram of a modified digital video signal clamping circuit embodying the invention for component video signals.

In order to handle component video signals, the circuit of FIG. 2 could be replicated for each component. That is to say, for example, there could be three like circuits, one each handling R, G and B or one each for handling Y, U and V. Alternatively, as will now be described, the low speed processing described above enables the low speed processing elements to be shared as between the plural components in order to minimize redundant circuitry. More specifically, as illustrated in FIG. 2A, such an arrangement could comprise three circuits as described with reference to FIG. 2 except that the PROM 22, accumulator 24 and DAC 28 could be shared on a time-division multiplex basis between the three circuits.

In the foregoing regard, multi-port DACs, to which one can feed plural 8-bit signals which are registered and fed to separate outputs, each of which can be selected, are available as standard items whereby the multiplexing of three sets of signals through a single such DAC presents no problems. Similarly, the multiplexing of three inputs to a single PROM presents no problems. Thus, for example, R, G and B signals from three respective FIFO registers 51, 52 and 53 readily can be multiplexed by a multiplexer from outputs thereof onto a common bus 56 and from there to a common black level error PROM 22. Signals from that PROM 22 could then be fed to an accumulator 54 having a delay of three registers (instead of one) to store three sets of results, which can then be passed sequentially to the a common DAC 50 which presents results at three outputs which are then fed to the operational amplifiers 32 of the respective three circuits.

Figure 4:
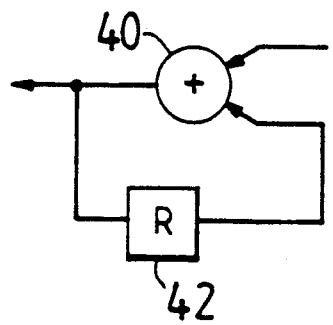
FIG. 4 shows an accumulator that may be used in the circuit of FIG. 2.
Figure 5:
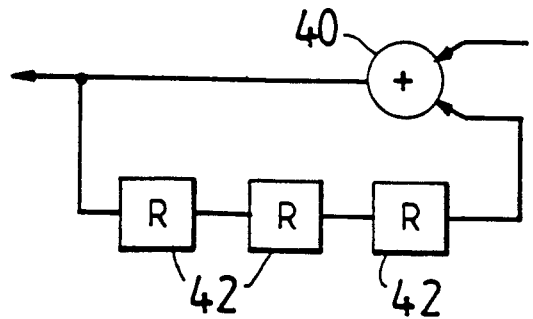
FIG. 5 shows a modification of the accumulator that can be used in an arrangement in which clamping circuits for video signal components share some circuitry in common.

Considering in more detail the accumulator of such a multiplexed arrangement, the circuit configuration of an accumulator for a single circuit may, as shown in FIG. 4, comprise an adder 40 and a register 42 connected as shown. For handling multiplexed R, G and B signals, one could use an accumulator as shown in FIG. 5, which is the same as that of FIG. 4 except that there are three registers 42 for R, G and B, respectively, the R, G and B signals being handled in sequence.

A circuit as described with reference to FIG. 2 has been constructed and tested and found to function well. It performs video clamping to provide dc restoration and to remove supply hum or noise, all in the digital domain. Thus, processing in the analog domain is greatly simplified, without resort to any complicated hardware. The circuit is also substantially linear and should follow normal linear equations for large input signal errors. Further, the taking of several samples on each back porch provides a technique for averaging noise errors in a better way than can be achieved with purely analog clamp circuits.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A video signal clamping circuit comprising:
analog-to-digital converter means for converting an analog input video signal to a plurality of digital samples taken at a sampling frequency;
storage means for storing at least some of said plurality of digital samples during a portion of a horizontal blanking interval of the input video signal during which the signal is at a black level;
an error signal generator operative to generate a digital error signal representing any deviation between one of said plurality of digital samples supplied thereto from said storage means and a reference black level;
an accumulator operative to accumulate digital error signals supplied thereto by said error signal generator to produce an accumulated digital error signal;
a digital-to-analog converter for converting said accumulated digital error signal to an analog error signal;
clock means for controlling the supply of said stored plurality of digital samples in sequence from said storage means to said error signal generator such that said stored plurality of digital samples are supplied, during a line-active period that follows said horizontal blanking interval, at a clock frequency which is less than said sampling frequency; and
combining means for combining said analog error signal with said input video signal such that the black level of said input video signal approaches said reference black level.

2. A circuit according to claim 1, wherein said storage means comprises a first-in, first-out register.

3. A circuit according to claim 1, wherein said storage means is operative to store said at least some of said plurality of digital samples during a back porch portion of the horizontal blanking interval.

4. A circuit according to claim 1, wherein said combining means comprises an operational amplifier having one input connected to receive said input video signal, another input connected to receive said analog error signal and an output, and wherein said analog-to-digital converter means is coupled to the output of said operational amplifier to receive the input video signal therefrom.

5. A circuit according to claim 1, including an amplifier connected between said digital-to-analog converter and said combining means, said amplifier having a resistive-capacitive feedback circuit to stabilize said circuit and to cause said analog error signal to be smoothed before it is passed to said combining means.

6. A circuit according to claim 1, for clamping a plurality of input video signals, wherein said storage means and combining means are replicated so that there is one for each video signal, and said error signal generator, accumulator and digital-to-analog converter are timemultiplexed so that they can process all of said video signals.

7. A circuit according to claim 1, for clamping a composite color input video signal, wherein said sampling frequency is equal to a multiple of the color subcarrier frequency of the input video signal and said storage means is arranged to store a number of digital samples which is equal to one of said multiple and an integral multiple thereof.

* * * * *